(12) United States Patent
Dorendorf (10) Patent No.: US 8,640,970 B2
(45) Date of Patent: Feb. 4, 2014

(54) AIR QUALITY CONTROL SYSTEM

(75) Inventor: Bruce Dorendorf, Winnebago, MN (US)

(73) Assignee: Direct Success, LLC, Cape Coral, FL (US)

( * ) Notice: Subject to any disclaimer, the term of this patent is extended or adjusted under 35 U.S.C. 154(b) by 924 days.

(21) Appl. No.: 12/787,867

(22) Filed: May 26, 2010

(65) Prior Publication Data

US 2010/0301123 A1    Dec. 2, 2010

Related U.S. Application Data

(60) Provisional application No. 61/181,396, filed on May 27, 2009.

(51) Int. Cl.
*F24F 7/00* (2006.01)
*E03D 9/04* (2006.01)

(52) U.S. Cl.
USPC .............................. 236/49.3; 4/211; 454/343

(58) Field of Classification Search
USPC .......... 236/49.3; 4/209 R, 211; 454/339, 341, 454/343
See application file for complete search history.

(56) References Cited

U.S. PATENT DOCUMENTS

| | | | |
|---|---|---|---|
| 4,953,784 A | 9/1990 | Yasufuku et al. |
| 5,232,152 A | 8/1993 | Tsang |
| 5,305,472 A | 4/1994 | Eger |
| 5,809,826 A | 9/1998 | Baker, Jr. |
| 6,058,519 A | 5/2000 | Quintana |
| 6,230,980 B1 | 5/2001 | Hudson |
| 6,287,191 B1 | 9/2001 | Barker, II |
| 6,678,900 B2 | 1/2004 | Ware |
| 6,804,837 B1 | 10/2004 | Guess, Sr. |
| 6,935,570 B2 | 8/2005 | Acker, Jr. |
| 6,940,410 B2 | 9/2005 | Deacy |
| 7,226,496 B2 | 6/2007 | Ehlers |
| 7,325,748 B2 | 2/2008 | Acker, Jr. |
| 7,380,292 B1 | 6/2008 | Harris |
| 2002/0083767 A1 | 7/2002 | Kemp |
| 2003/0222783 A1 | 12/2003 | Amacher |
| 2004/0078888 A1 | 4/2004 | Noro et al. |

(Continued)

FOREIGN PATENT DOCUMENTS

| | | | |
|---|---|---|---|
| JP | 02247436 A | * | 10/1990 |
| JP | 05-26486 | | 2/1993 |
| JP | 05-180475 | | 7/1993 |
| JP | 2003279091 | | 10/2003 |

*Primary Examiner* — Marc Norman
(74) *Attorney, Agent, or Firm* — Buckert Patent & Trademark Law Firm, P.C.; John F. Buckert (57) ABSTRACT

The present invention provides methods, devices and systems for improving air quality. In one exemplary embodiment, the invention provides an air quality control system for maintaining or improving air quality within a room. The air quality control system includes a fan in fluid communication with a room. The fan is configured to vent air from within the room to control air quality therein. The air quality control system further includes a fluid flow sensor located proximate to a conduit. The fluid flow sensor is in communication with a wireless transmitter configured to generate a signal based upon fluid flow through the conduit. The air quality control system also includes a receiver configured to receive the wireless signal generated by the wireless transmitter, wherein the receiver is in communication with the fan to cause activation of the fan based upon the signal generated by the wireless transmitter.

13 Claims, 4 Drawing Sheets

(56) References Cited

U.S. PATENT DOCUMENTS

| | | |
|---|---|---|
| 2006/0213000 A1 | 9/2006 | Kimball et al. |
| 2006/0286922 A1 | 12/2006 | Roux et al. |
| 2008/0011863 A1 | 1/2008 | Roux et al. |
| 2009/0065595 A1 | 3/2009 | Kates |

* cited by examiner

AIR QUALITY CONTROL SYSTEM

CROSS-REFERENCE TO RELATED APPLICATION

The present application claims benefit of U.S. Provisional Patent Application No. 61/181,396, filed May 27, 2009, the contents of which are hereby incorporated by reference in its entirety for all purposes.

FIELD OF THE INVENTION

The present invention relates to methods and systems for maintaining or improving air quality within a room.

BACKGROUND

Air quality can be measured by levels of unwanted contaminants such as humidity, particulate matter, certain gases, or otherwise, within a specified region. Poor air quality can have negative effects on the surrounding environment, including building structure, equipment, people or otherwise. This negative effect can be exacerbated in small confined locations where the concentration of contaminants is increased. However, such negative effect can be equally felt in larger areas when the levels of unwanted contaminants exceed desired levels.

In smaller confined areas, such as bathrooms or otherwise, humidity levels can negatively affect paint, drywall, wood and metal located therein by causing increased decay, oxidation or other damaging effects to the particular material. For this reason, venting systems are placed in fluid communication with bathrooms for removal of humidity within the room. However, such venting systems typically require manual activation and deactivation. This manual requirement leads to the accumulation of unwanted humidity and/or excessive wear on the venting system when operating beyond a necessary time period. Also, physically challenged individuals, particularly in assisted care situations, have difficulty in activating and deactivating such devices as they may be out of reach.

The building industry has attempted to provide improved venting systems for rooms and facilities by providing occupancy or humidity sensors. However, these systems are often complex in design and installation, and are relatively high in cost. Further, installers of such systems are often required to be certified electricians thereby further increasing labor cost.

In view of the foregoing, there is a need for an improved venting system for the removal of unwanted contaminants, particularly in confined spaces such as bathrooms or otherwise.

SUMMARY OF THE INVENTION

The present invention provides methods, devices and systems for improving air quality, particularly air quality within a room or other specified spaces. In one exemplary embodiment, the invention provides an air quality control system for maintaining or improving air quality within a room. The air quality control system includes a fan in fluid communication with a room. The fan is configured to vent air from within the room to control air quality therein. The air quality control system further includes a fluid flow sensor located proximate to a conduit. The fluid flow sensor is in communication with a wireless transmitter configured to generate a wireless signal based upon fluid flow through the conduit. The air quality control system also includes a receiver configured to receive the wireless signal generated by the wireless transmitter, wherein the receiver is in communication with the fan to cause activation of the fan based upon the signal generated by the wireless transmitter.

The above-described and other features and advantages of the present invention will be appreciated and understood by those skilled in the art from the following detailed description, drawings, and appended claims.

BRIEF DESCRIPTION OF THE DRAWINGS

Other objects, features, advantages and details of the present invention appear, by way of example only, in the following detailed description of preferred embodiments of the invention, the detailed description referring to the drawings in which.

DESCRIPTION OF THE PREFERRED EMBODIMENTS

The present invention provides methods, devices and systems for improving air quality, particularly air quality within a room or other specified spaces. In one particular aspect, the present invention provides an air venting system that is automatically activated and deactivated without required manual activation by an individual. The air venting system is simplistic in design, relatively low in cost and configured to be installed or incorporated into existing vent systems by a home owner or other layperson.

In another aspect, the present invention provides a fluid monitoring device configured to determine the existence of fluid flow through a conduit of a shower head and provide an indication for activation of an air venting system. Advantageously, by monitoring fluid flow through a shower head, or otherwise, particularly fluid flow having suitable temperature to generate humidity within a bathroom or otherwise, the air venting system can be activated to vent humidity from the bathroom without user intervention. Further, the automatic activation or deactivation prevents insufficient or prolonged use of the air venting system. The fluid monitoring device is configured to be attached or incorporated with a conduit in fluid communication with a shower head for a bathroom.

Figure 1:
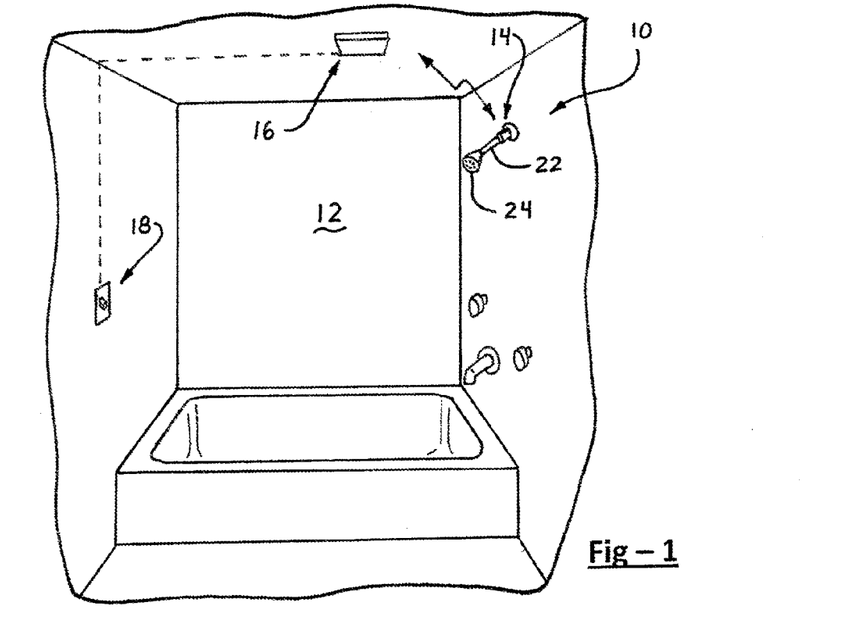
FIG. 1 illustrates an exemplary embodiment of an air quality control system according to the teachings of the present invention.

Referring to FIG. 1, an exemplary embodiment of an air quality control system 10 is shown. In this configuration, the system 10 is incorporated with an air venting system of a bathroom 12. The system 10 includes a sensor assembly 14, a fan assembly 16 and a switch assembly 18. Optionally, the system further includes one or more circuits 20, i.e. control circuits or otherwise, for controlling or modifying signals. Other components are contemplated as described herein or otherwise. In the configuration shown in FIG. 1, the sensor assembly 14 is disposed proximate a pipe conduit 22 of a shower head 24 for monitoring fluid flow therethrough. The sensor assembly 14 is in communication with the fan assembly 16 for causing ventilation of humidity or otherwise from the bathroom 12.

Figure 2:
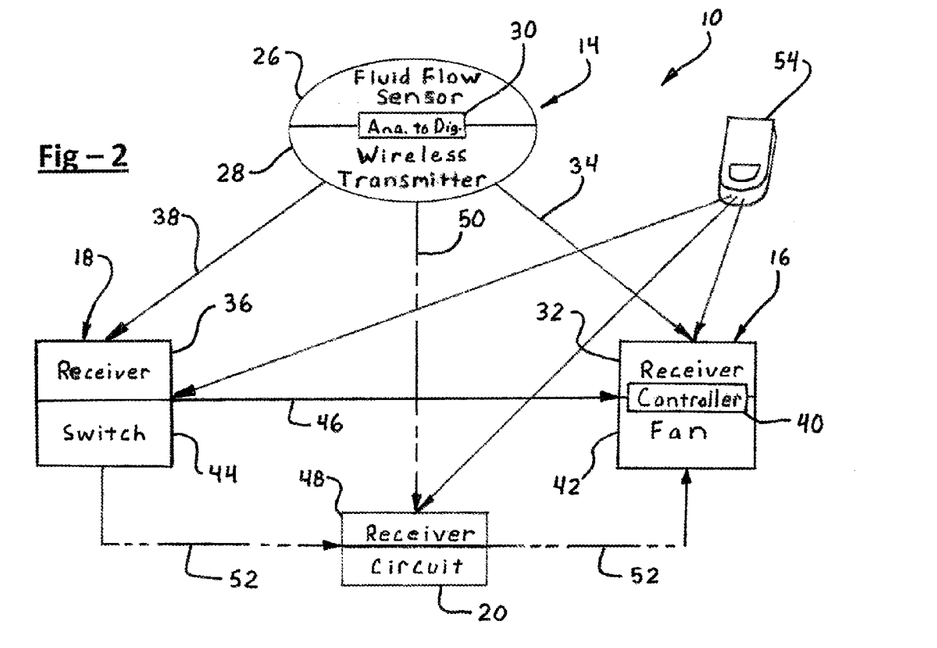
FIG. 2 illustrates a schematic diagram of an air quality control system according to the teachings of the present invention.

Referring to the schematic diagram of the air quality control system 10 shown in FIG. 2, the sensor assembly 14 includes a fluid flow sensor 26 configured for monitoring fluid flow through a conduit, such as pipe conduit 22 shown in FIG. 1. The sensor assembly further includes a wireless transmitter 28 in communication with the fluid flow sensor 26. The wireless transmitter 28 is configured to generate a wireless signal corresponding to measurements, or fluid flow presence, determined by fluid flow sensor 26. Optionally, it is contemplated that an analog to digital convertor 30 is provided for converting the analog signals generated by the fluid flow sensor 26 to digital signals for relay by wireless transmitter 28. However, it should be appreciated that the wireless transmitter 28 may alternatively generate analog signals, such as radio waves e.g., frequency modulated signals (FM) or amplitude modulated signals (AM), microwaves, infrared waves or otherwise. It should be appreciated that the analog to digital convertor may be disposed with, or communicatively between, any of the sensor assembly 14, fan assembly 16 or switch assembly 18. Other potential wireless communications system useable with the present invention include ZigBee®, Bluetooth®, or otherwise.

The signal generated by the wireless transmitter 28 is received by a wireless receiver 32 of the fan assembly 16 through a first wireless connection 34 or a wireless receiver 36 of the switch assembly 18 through a second or alternate wireless connection 38, or both. However, it is contemplated that the signal generated by the wireless transmitter 28 is eventually relayed in some manner to a fan controller 40 of a fan 42 for controlling ventilation of bathroom 12 or otherwise. To this extent, it is possible that the wireless receiver 36 is disposed proximate to a manual switch 44 configured for controlling the fan 42 through a wired connection 46, though communication may advantageously be achieved through a wireless communication as well. Alternatively, it is further contemplated that the circuit 20 may include a wireless receiver 48 for forming a third or alternate wireless connection 50. In this configuration, the circuit 20 is in communication with the fan assembly 16 and switch assembly 18 through a wired or wireless connection 52.

Optionally, it is contemplated that the air quality control unit 10 may include one or more remote control units 54 useable by an individual to control the fan 42 for humidity removal, odor removal or otherwise from the particular room or area. In this configuration, it is contemplated that the remote control unit may be in communication with the wireless receiver 32 of the fan assembly 16 or the wireless receiver 34 of the switch assembly 18, or both. Accordingly, a user may activate the fan 42 at any time, and/or at any location, through the remote control unit 54.

In another optional configuration, it is contemplated that sensor assembly 14, fan assembly 16 and/or switch assembly 18 includes a manual activation device 86, such as a button switch or otherwise, for causing activation of the fan assembly. In one configuration, referring to FIG. 4, the manual activation device 86 is in communication with the wireless transmitter 28 of the sensor assembly 14 for transmitting a signal based upon the manual activation device 86. In this configuration, should a user desire activation of the fan assembly 16 during times where the fan assembly 16 would not normally operate, due to low humidity levels or otherwise, the user is provided the opportunity to manually activate the fan assembly 16.

The fluid flow sensor 26 of the present invention may comprise any sensor configured to determine the presence of fluid flow, particularly through a conduit. In one configuration, as described below, that the fluid flow sensor 26 may be configured to ascertain a temperature of fluid flowing through a conduit for activating the fan assembly 16. Advantageously, should the temperature of the fluid be capable of generating steam or humidity the fan assembly 16 will be activated. In another configuration, also described below, the fluid flow sensor 26 may comprise a magnetic sensor configured to sense the generation of a magnetic field based upon movement of naturally occurring minerals within a fluid flow. In yet another configuration, the fluid flow sensor 26 may comprise a vibration sensor configured to monitor whether fluid flow is occurring through a conduit, based upon known vibration values typically generated by fluid flow. In still another configuration, the fluid flow sensor 26 may comprise a pressure sensor configured to determine fluid flow through the conduit based upon increased fluid pressure generated by the fluid flow. In another configuration, the fluid flow sensor 26 may comprise a current sensor configured to sense an accumulation of static electricity over the conduit due to fluid flow therein. In another configuration, the sensor comprises a circuit, or at least a portion thereof, that is completed by the fluid flowing through the conduit. The fluid flow sensor 26 generates a signal, via a suitable power source, indicative of fluid flow that is received by transmitter 28.

In any of the above configurations, in one exemplary embodiment, it is contemplated that the sensor assembly 14, including the transmitter 28, may be powered through a battery or other suitable power means. In another exemplary embodiment, power is obtained through a generation of current by movement of fluid through the conduit. In yet another exemplary embodiment, power is obtained through a capacitor wherein potential energy stored by the capacitor is release upon fluid flow through a conduit. It is possible that a current or signals generated by the sensors are suitable in strength for powering the transmitter without or in conjunction with an additional poser source. It should be appreciated that other power sources are available. However, in a preferred configuration it is contemplated that the power source for generating signals for the sensor or through the wireless transmitter 28 includes a low voltage and/or current that poses no risk to persons, even in the presence of conducting fluids, such as water. It should be appreciated that other low voltage and/or current sensor configurations are possible.

Optionally, the sensor assembly 14 further includes a temperature indicator 84 for providing an indication of the temperature of the fluid flow through the pipe conduit 22. The temperature indicator 84 may be located on or with the sensor assembly 14, located on the pipe conduit 22 or otherwise. Accordingly, the temperature indicator 84 may be in communication with the fluid flow sensor 26 or function independently. In one configuration, the temperature indicator 84 provides a digital readout of the temperature of fluid flow through the pipe conduit 22. In another configuration the temperature indicator 84 provides a color indicator of the temperature. Other configurations are possible.

In one configuration, it is contemplated that multiple sensors may be used with the air quality control system 10. This may include one or more of the fluid flow sensors 26 described herein and optionally, one or more remote control devices and/or one or more additional sensors. Such additional sensors may comprise humidity sensors, occupancy sensors, odor sensors, temperature sensors or otherwise. The multiple sensors may be located in one or more locations within a specified region. For example, with reference to the bathroom configuration shown in FIG. 1, sensors may be disposed with pipe conduits, shower heads, sink and/or bathtub faucets, toilets, walls, ceilings, floors, mirrors, shower curtains or curtain rods, window, blinds or otherwise. In a multiple sensor configuration, it is possible that one or more, or even all, of the sensors are in wired and/or wireless communication with the fan assembly 16. Accordingly, the multiple sensors may communicate over a common frequency and/or control circuit.

The fluid flow sensor 26 may comprise a stand along component configured for attachment to a conduit or may comprise a portion of the conduit itself. Accordingly, a user may purchase a fluid flow sensor 26 of the present invention that may be attached to existing conduit components, e.g., pipe member, shower head, faucet or otherwise, or may replace an existing conduit component, e.g., pipe member, shower head, faucet or otherwise. To this end, in one configuration the sensor may be integrally formed with the conduit or may be separately formed for attachment to the conduit. As such, the fluid flow sensor 26 may be in direct or indirect contact with the fluid flowing through a conduit. Further, in one exemplary embodiment, the sensor is in-line with the fluid flowing through the conduit, wherein fluid passes on one or more sides of the sensor or even substantially about the entirety of the sensor.

Figure 3:
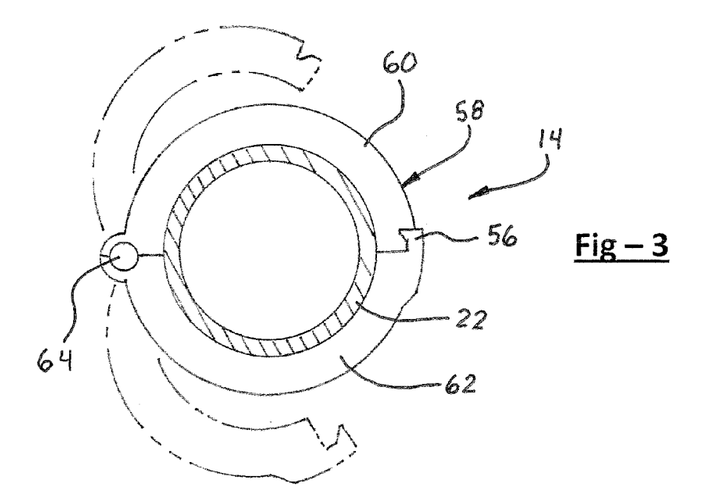
FIG. 3 illustrates an end view of an exemplary fluid flow sensor according to the teachings of the present invention.
Figure 4:
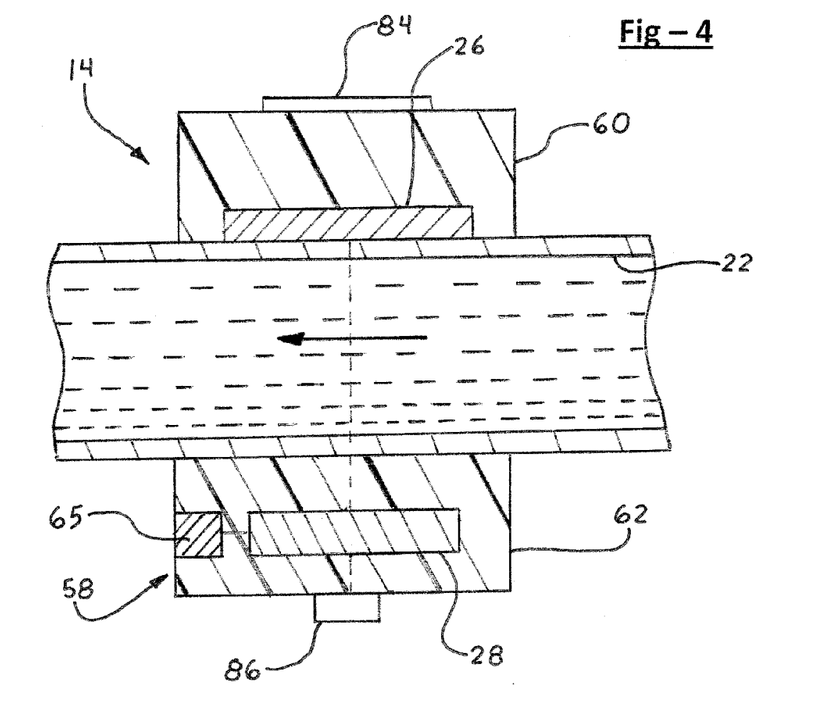
FIG. 4 illustrates a cross-sectional view of the fluid flow sensor shown in FIG. 3.

In one sensor configuration, referring to FIGS. 3 and 4, the sensor assembly 14 is configured for attachment to the pipe conduit 22 of the shower head 24. The sensor assembly 14 is releasably attached to the pipe conduit 22 through a locking mechanism 54. The locking mechanism 54 comprises a snap-fit configuration; however, it is also contemplated that adhesives (such as thermally conductive adhesive or otherwise) and/or fasteners may be alternatively or used in conjunction with the snap-fit configuration. In the particular configuration shown, the sensor assembly 14 includes a shell 58 having a first half 60 attached to a second half 62 through a hinge 64. The first and second half 60, 62 are configured to envelope the pipe conduit 22 and maintain position of the first and second half 60, 62 through the locking mechanism 56.

With reference to FIG. 4, the first half 60 of the sensor assembly 14 includes the fluid flow sensor 26 for detecting fluid flow through the pipe conduit 22. The fluid flow sensor 26 is located proximate the pipe conduit 22 and more particularly in thermal communication with the pipe conduit 22. Accordingly, changes in temperature of the pipe conduit 22, as a result of fluid flow therethrough, can be measured by the fluid flow sensor 26. In this configuration, the fluid flow sensor 22 may comprise a thermistor for monitoring change in resistance through the fluid flow sensor 26 to determine the temperature of the fluid flowing through the pipe conduit 22. The fluid flow sensor may alternatively comprise a stress sensor that monitors expansion of the sensor, via expansion of the pipe conduit 22, as a result of heated fluid, to determine the temperature of the fluid flowing through the pipe conduit. The fluid flow sensor is in communication with the wireless transmitter 28 for transmitting the measurement, or activation signal, from the fluid flow sensor 26 to the fan assembly 16. The shell is further configured for receiving a battery 63 for providing power to the fluid flow sensor 26 and/or wireless transmitter 28. However, as previously described, other power sources are contemplated as described herein.

Alternatively, in another configuration, the fluid flow sensor 26 comprises a magnetic flux sensor and is placed in magnetic communication with the fluid flowing through the pipe conduit 22 for monitoring magnetic flux generated by the fluid flow through the pipe conduit. In this configuration, the fluid flow sensor 26 is able to determine the presence of fluid flow through the pipe conduit 22 as a result of the flow of magnetic elements naturally flowing with the water through the pipe conduit, such as iron or otherwise.

Figure 5:
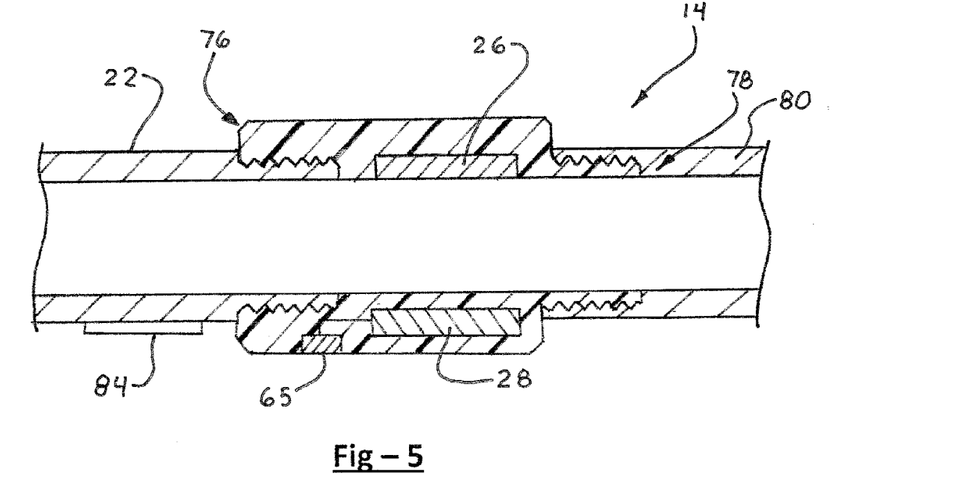
FIG. 5 illustrates a cross-sectional view of an alternate fluid flow sensor according to the teachings of the present invention.

In another sensor configuration, referring to FIG. 5, the sensor assembly 14 is configured for threaded attachment to a conduit, e.g. one or more pipe conduits 22 and/or shower heads 24. As with the embodiment shown in FIGS. 3 and 4, this configuration provides easy installment of the sensor assembly 14 to an existing pluming system of a house or otherwise. In the particular configuration shown, the sensor assembly includes a first end 76 having a female threaded component configured for engagement with a pipe conduit 22 extending from a shower head and a second end 78 having a male threaded component configured for engagement with a fluid source pipe conduit 80. The sensor includes a fluid flow sensor 26 that is in communication with a wireless transmitter 28 configured for generation of a wireless signal based upon signals generated by the fluid flow sensor 26. Optionally, the fluid flow sensor 26, transmitter or both may be powered by battery 65 or otherwise. In this configuration, the fluid flow sensor 26 is in direct contact with fluid flowing through pipe conduit 22.

Figure 6:
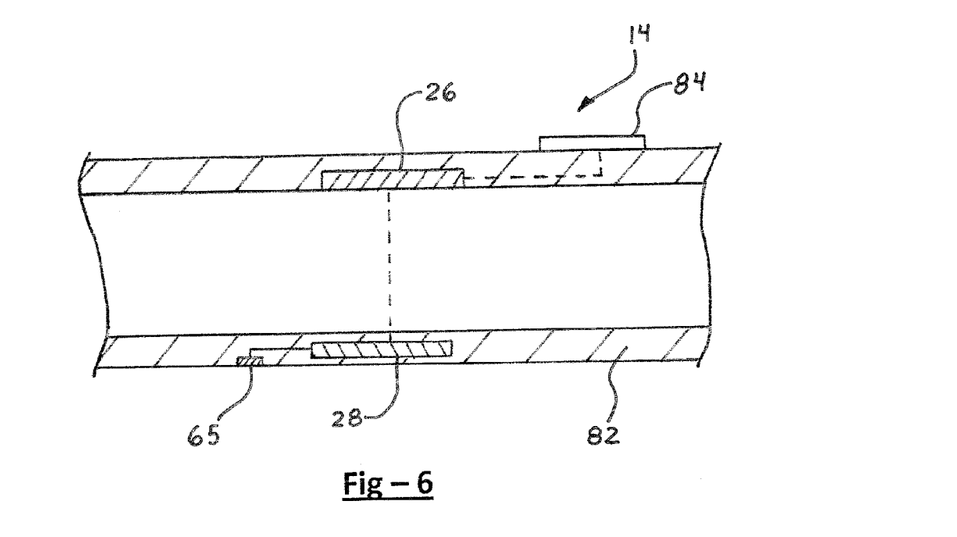
FIG. 6 illustrates a cross-sectional view of another alternate fluid flow sensor according to the teachings of the present invention.

In still another sensor configuration, referring to FIG. 6, the sensor assembly 14 is integrally formed with an additional pipe member 82, which may be used to replace all, or a portion of, pipe conduit 22, fluid source pipe conduit 80 or otherwise. The sensor assembly 14 includes fluid flow sensor 26 in communication with wireless transmitter 28, wherein either one of the fluid flow sensor, wireless transmitter or both may be powered by battery 65 or otherwise. As with the sensor assembly configuration shown in FIG. 5, the fluid flow sensor 26 is in direct contact with fluid flowing through pipe conduit 22.

Figure 7:
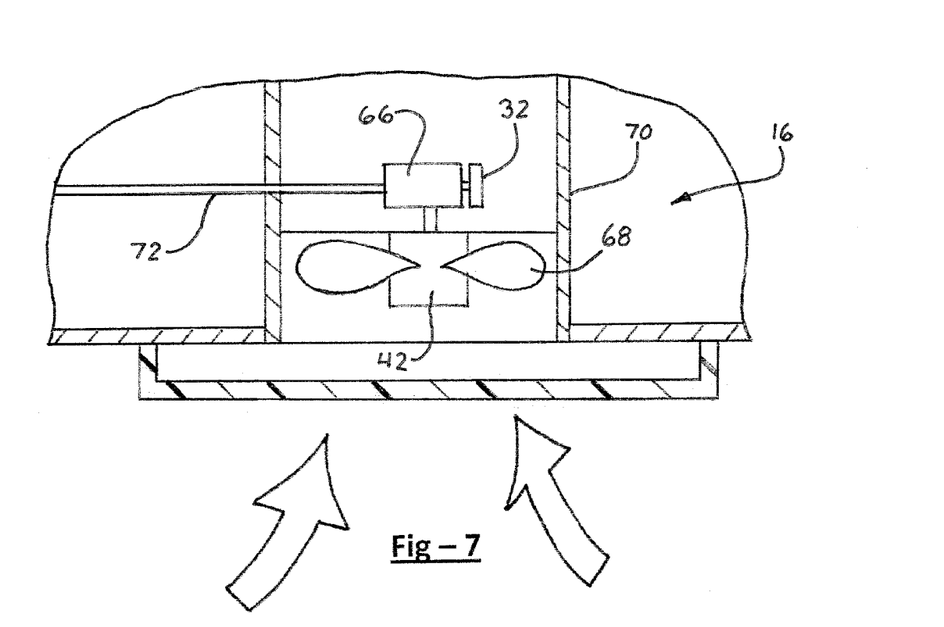
FIG. 7 illustrates a cross-sectional view of an exemplary fan assembly according to the teachings of the present invention.

Referring to FIG. 7, the exemplary fan assembly 16 of the air quality control system 10 is shown. The fan assembly 16 includes wireless receiver 32 configured for receiving signals from the wireless transmitter 28 of the fluid flow sensor 26. The wireless receiver 32 is in communications with controller 40 (see FIG. 2) that controls operation of a motor 66 for rotating fan blades 68. The fan assembly 16 is housed within a vent 70 for drawing air from the bathroom through the vent and to a location outside of the bathroom, e.g., house or otherwise. The fan assembly is powered through a wire 72 that may be connected to the switch assembly 18, as described herein. Accordingly, the controller 40 may be activated by the wireless transmitter 28 directly or indirectly through the switch assembly 18 or independent of the switch assembly 18. Further the controller 40 may be activated through a manual switch, such as switch 44 of the switch assembly 18.

Figure 8:
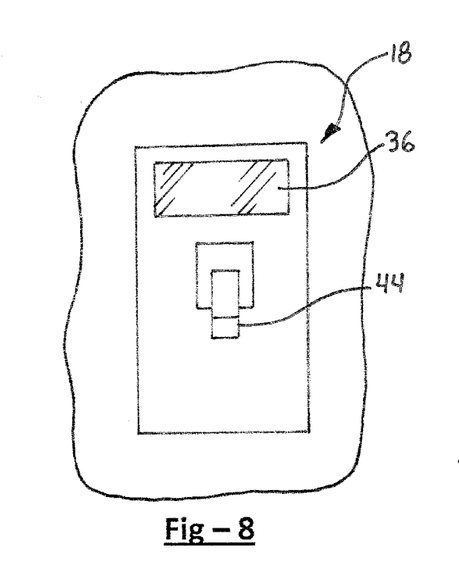
FIG. 8 illustrates an elevational view of an exemplary switch assembly according to the teachings of the present invention.
Figure 9:
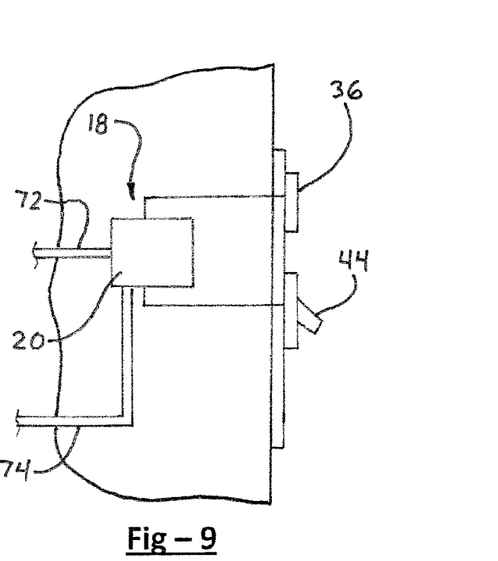
FIG. 9 illustrates a side view of the exemplary switch assembly shown in FIG. 8.

Referring to FIGS. 8 and 9, several views of the exemplary switch assembly 18 of the air quality control system 10 are shown. The switch assembly 18 includes wireless receiver 36 for receiving signals from the sensor assembly 14. The switch assembly 18 includes manual switch 44 for manually activating the fan assembly 14. The wireless receiver 36 and the manual switch 44 are connected to the fan assembly 18, via wire 72, for controlling activation thereof. Accordingly, the switch assembly 18 is further connected to a power supply (not shown) through a power supply wire 74. It should be appreciated that the switch assembly 18 may further include a circuit 76 for controlling transmission of signals, or power, from the manual switch 44 and/or wireless receiver 36 to the fan controller 40.

In one configuration, referring to FIG. 2, it is contemplated that the fan assembly 16 is controllable through one or more remote control units 54, which may or may not be in conjunction with the sensor assembly 14. This provides the ability of a user to control activation of the fan assembly separate from the sensor assembly 14. Activation of the fan assembly may be based upon humidity levels, odor levels or other contaminate or non-contaminant occurrence within the bathroom 12, or other room or area. The remote control unit 54 may be in direct communication with the fan assembly 16 or indirect communication with the fan assembly, such as through switch assembly 18 or otherwise.

The air quality control system 10 automatically detects the presence or anticipated accumulation of humidity within a bathroom 12, or otherwise, and activates the fan assembly 16 until sufficient removal of the humidity is achieved and/or for a predetermined time period. In one method of operation, referring to FIG. 1, a user directs water through a pipe conduit 22 of a shower head 24. The sensor assembly determines the presence of water flow through the pipe conduit 22, and/or temperature of the water flowing through the pipe conduit 22, to further determine whether activation of a fan assembly is necessary for reducing or maintain humidity levels within the bathroom 12. Should reduction of humidity within the bathroom 12 be desired, a wireless signal is sent to the fan assembly 16 directly, or through switch assembly 18, to cause activation of the fan assembly. When flow of water through the pipe conduit 22 is discontinued, or the temperature of water flowing through the pipe conduit 22 is at a level where humidity accumulation is not likely, or even the humidity or contaminant levels have decreased to acceptable levels, another signal may be transmitted directly or indirectly to the fan assembly 16 to deactivate the fan assembly immediately or after a predetermined time period. Alternatively, as described above, the fan may simply deactivate after a predetermined time period.

It should be appreciated that the fan assembly 16 may comprise a new or altered fan assembly. Similarly, the switch assembly 18 may comprise a new or altered switch assembly. To this end, it is contemplated that the components of the sensor assembly 14 may be sold as a kit along with components of the fan assembly 16 and/or switch assembly 18 for providing an individual with a simplified method of forming an air quality control system 10 according to the teachings of the present invention.

It should be appreciated that while the air quality control system 10 is shown incorporated with a venting system of a bathroom, it should be appreciate that the system may be used in other rooms or environment including open areas, closed areas, multi-room areas or otherwise. Similarly, the fluid flow sensor 26 may be used on other conduits, including gas or liquid, to determine characteristics (i.e. temperatures, composition or otherwise) of the fluid flow. Specific examples of other conduits include water or gas lines, for houses or other building structure, or otherwise.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An air quality control system for maintaining or improving air quality within a room, comprising:
   a sensor assembly having a housing portion, a fluid flow sensor, and a wireless transmitter; the housing portion defining a fluid flow path between a first end and a second end, the fluid flow sensor being disposed in the housing portion, the fluid flow sensor configured to communicate with the wireless transmitter;
   the fluid flow sensor configured to detect fluid flow through the housing portion and to generate a first signal indicative of the fluid flow which is received by the wireless transmitter;
   the wireless transmitter configured to generate a first wireless signal based on the first signal received from the fluid flow sensor; and
   a fan assembly having an electric motor, a fan blade, a controller, and a wireless receiver therein, the electric motor being in driving engagement with the fan blade, the controller configured to communicate with the wireless receiver, the controller configured to activate the electric motor when the wireless receiver receives the first wireless signal from the wireless transmitter.

2. The air quality control system of claim 1, wherein:
   the wireless transmitter further configured to generate a second wireless signal when the fluid flow sensor detects that the fluid flow is discontinued through the housing portion; and
   the controller further configured to deactivate the electric motor when the wireless receiver receives the second wireless signal from the wireless transmitter.

3. The air quality control system of claim 1, further comprising:
   a manual activation switch being disposed on the housing portion, the manual activation switch configured to generate a second wireless signal; and
   the controller further configured to activate the electric motor when the wireless receiver receives the second wireless signal from the manual activation switch.

4. The air quality control system of claim 1, wherein the housing portion is configured to be threadably coupled to a pipe.

5. The air quality control system of claim 1, wherein the first end of the housing portion includes a threaded male portion, and the second end of the housing portion includes a threaded female portion.

6. The air quality control system of claim 1, wherein the fluid flow sensor is disposed in a groove of the housing portion and directly communicates with the fluid flow path.

7. The air quality control system of claim 1, wherein the fluid flow sensor comprises a temperature sensor configured to monitor changes in temperature as a result of the fluid flow through the housing portion.

8. The air quality control system of claim 1, wherein the fluid flow sensor comprises a magnetic flux sensor configured to monitor magnetic fields generated by particles in the fluid flow through the housing portion.

9. The air quality control system of claim 1, wherein the fluid flow sensor comprises a vibration sensor configured to monitor vibrations as a result of the fluid flow through the housing portion.

10. The air quality control system of claim 1, wherein the fluid flow sensor comprises a pressure sensor configured to monitor pressure changes as a result of the fluid flow through the housing portion.

11. The air quality control system of claim 1, wherein the fluid flow sensor comprises a current sensor configured to sense an accumulation of static electricity as a result of the fluid flow through the housing portion.

12. The air quality control system of claim 1, wherein the fluid flow sensor comprises a stress sensor configured to sense thermal expansion of the sensor assembly as a result of the fluid flow through the sensor assembly.

13. An air quality control system for maintaining or improving air quality within a room, comprising:

a sensor assembly having a housing portion, a fluid flow sensor, and a wireless transmitter; the housing portion defining a fluid flow path between a first end and a second end, the fluid flow sensor being disposed in the housing portion, the fluid flow sensor configured to communicate with the wireless transmitter; the fluid flow sensor configured to detect fluid flow through the housing portion;

the wireless transmitter configured to generate a first wireless signal when the fluid flow sensor detects the fluid flow through the housing portion;

a fan assembly having an electric motor, a fan blade, a controller, and a wireless receiver therein, the electric motor being in driving engagement with the fan blade, the controller configured to communicate with the wireless receiver, the controller configured to activate the electric motor when the wireless receiver receives the first wireless signal from the wireless transmitter; and the wireless transmitter further configured to generate a second wireless signal when the fluid flow sensor detects that the fluid flow is discontinued through the housing portion; and the controller further configured to deactivate the electric motor when the wireless receiver receives the second wireless signal from the wireless transmitter.

\* \* \* \* \*